United States Patent
Kawazoe et al.

(10) Patent No.: US 8,463,118 B2
(45) Date of Patent: *Jun. 11, 2013

(54) IMAGING SYSTEM, CAMERA BODY AND INTERCHANGEABLE LENS

(75) Inventors: Kenji Kawazoe, Hyogo (JP);
Mitsuyoshi Okamoto, Osaka (JP);
Naotake Kitahira, Osaka (JP); Koji Shibuno, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/483,533

(22) Filed: May 30, 2012

(65) Prior Publication Data
US 2012/0237194 A1 Sep. 20, 2012

Related U.S. Application Data

(63) Continuation of application No. 12/411,497, filed on Mar. 26, 2009, now Pat. No. 8,208,057.

(30) Foreign Application Priority Data

Mar. 27, 2008 (JP) ................. 2008-082793
May 29, 2008 (JP) ................. 2008-140353

(51) Int. Cl.
*G03B 3/00* (2006.01)
*G03B 13/00* (2006.01)

(52) U.S. Cl.
USPC ............................ 396/125; 348/345; 348/360

(58) Field of Classification Search
USPC .............. 348/345, 357, 360; 396/79, 86, 125, 396/135
See application file for complete search history.

(56) References Cited

U.S. PATENT DOCUMENTS

| 5,194,956 | A | * | 3/1993 | Iwamoto ..................... 348/347 |
| 5,761,560 | A | * | 6/1998 | Miyazawa et al. ............ 396/532 |
| 6,608,651 | B2 | | 8/2003 | Mabuchi et al. |
| 7,193,651 | B2 | * | 3/2007 | Kato ............................. 348/349 |
| 7,596,310 | B2 | | 9/2009 | Ono et al. |
| 7,602,436 | B2 | | 10/2009 | Kikuchi |
| 8,089,546 | B2 | * | 1/2012 | Omaki et al. ............ 348/333.01 |
| 8,164,680 | B2 | * | 4/2012 | Kawazoe et al. ............ 348/345 |
| 2005/0099523 | A1 | * | 5/2005 | Konishi et al. ................ 348/345 |

(Continued)

FOREIGN PATENT DOCUMENTS

| EP | 0425243 | 5/1991 |
| EP | 1613062 | 1/2006 |

(Continued)

*Primary Examiner* — Clayton E LaBalle
*Assistant Examiner* — Warren K Fenwick
(74) *Attorney, Agent, or Firm* — Panasonic Patent Center

(57) ABSTRACT

An imaging system includes an interchangeable lens and a camera body. The camera body includes a main body controller operable to transmit a reference signal for providing a reference of a driving start timing of the focus lens and delay time information indicating delay time with respect to the reference signal, to the interchangeable lens. The interchangeable lens includes a lens controller operable to control the focus lens to be driven at a timing obtained by delaying the timing provided by the reference signal by the delay time based on the reference signal and the delay time information received from the main body controller. The delay time is set so that, for example, an exposure timing of a predetermined area in the imaging element is substantially coincident with a stop period of the wobbling operation of the focus lens.

9 Claims, 13 Drawing Sheets

U.S. PATENT DOCUMENTS

| | | | |
|---|---|---|---|
| 2006/0001763 A1* | 1/2006 | Takemoto | 348/345 |
| 2006/0232700 A1* | 10/2006 | Ito et al. | 348/345 |
| 2007/0058971 A1 | 3/2007 | Tsuda | |
| 2008/0002960 A1* | 1/2008 | Ito et al. | 396/125 |
| 2009/0262235 A1 | 10/2009 | Kawazoe et al. | |
| 2011/0063497 A1 | 3/2011 | Kawazoe et al. | |

FOREIGN PATENT DOCUMENTS

| | | |
|---|---|---|
| JP | 3137608 | 6/1991 |
| JP | 2000131594 | 5/2000 |
| JP | 2004117396 | 4/2004 |
| JP | 2005-277765 | 10/2005 |
| JP | 2006047954 | 2/2006 |
| JP | 2006-146062 | 6/2006 |
| JP | 2007013818 | 1/2007 |
| JP | 2007-322922 | 12/2007 |
| JP | 2008111995 | 5/2008 |

* cited by examiner

IMAGING SYSTEM, CAMERA BODY AND INTERCHANGEABLE LENS

BACKGROUND

1. Technical Field

The technical field relates to an imaging system including an interchangeable lens and a camera body, and a camera body and an interchangeable lens used for the imaging system, and in particular relates to a driving control operation of a focus lens included in the interchangeable lens.

2. Related Art

JP-A-2006-047954 has disclosed a technology relating to an auto-focus method used for carrying out high-speed auto-focus control with high precision. In accordance with the method disclosed by JP-A-2006-047954, a wobbling controller generates a wobbling control signal in such a manner that a timing of a period in which central pixels in a predetermined area of an image are exposed is coincident with the center timing between a period in which the wobbling operation is stopped on the near side and a period in which the wobbling operation is stopped on the far side. With this arrangement, the relationship between the timing of the wobbling operation and the exposure timing of pixels used for detecting a focus evaluation value can be optimized so that high-speed auto-focus control with high precision is realized.

In an imaging system including an interchangeable lens and a camera body, there have been strong demands for a technology for carrying out auto-focus control with high precision. However, in the imaging system including an interchangeable lens and a camera body, communication between the interchangeable lens and the camera body is made periodically, and thus it is not possible to transmit a wobbling control signal from the camera body to the interchangeable lens at a desired timing. For this reason, the technology described in JP-A-2006-047954 is not applicable to the imaging system including an interchangeable lens and a camera body.

SUMMARY

To solve the above-mentioned problems, an imaging system capable of performing auto-focus control with high precision is provided, and a camera body for such an imaging system is provided.

In a first aspect, an imaging system including an interchangeable lens and a camera body is provided. The interchangeable lens includes an optical system that includes a focus lens capable of moving backward and forward in an optical axis direction, and is operable to generate an optical image of an object, a first communication unit, and a lens controller operable to control drive of the focus lens. The camera body includes a second communication unit capable of communicating with the first communication unit, an imaging element operable to generate an image signal from the optical image, and a main body controller operable to transmit a reference signal for providing a reference of a driving start timing of the focus lens, and delay time information indicating delay time with respect to the reference signal, to the lens controller through the second communication unit and the first communication unit. The lens controller controls the focus lens to be driven at a timing obtained by delaying the timing provided by the reference signal by the delay time based on the reference signal and the delay time information received from the main body controller.

In a second aspect, a camera body to which an interchangeable lens having a focus lens and a first communication unit is mountable is provided. The camera body includes a second communication unit capable of communicating with the first communication unit, an imaging element operable to generate an image signal from an optical image formed by the interchangeable lens, and a main body controller operable to transmit a reference signal for providing a reference of a driving start timing of the focus lens and delay time information indicating delay time with respect to the reference signal to the interchangeable lens, through the second communication unit and the first communication unit.

In a third aspect, an interchangeable lens mountable to a camera body is provided. The interchangeable lens includes a focus lens capable of moving backward and forward in an optical axis direction, an optical system operable to generate an optical image of an object, a first communication unit, and a lens controller operable to control of drive of the focus lens. Based on a reference signal and delay time information indicating delay time with respect to the reference signal which are received from the main body controller, the lens controller controls the focus lens to be driven at a timing obtained by delaying the timing provided by the reference signal by the delay time.

In accordance with the aforementioned arrangement, the camera body transmits a reference signal and information indicating a delay time relative to the reference signal to an interchangeable lens, and based on the reference signal and the information indicating the delay time thus received, the interchangeable lens drive-controls the focus lens. For this reason, the exposure timing of a desired area of the imaging element can be made virtually coincident with the timing of a stop period of the wobbling operation of the focus lens so that it is possible to carry out auto-focus control with high precision. Moreover, by transmitting the reference signal from the camera body to the interchangeable lens during a period in which no communication process is performed between the interchangeable lens and the camera body, it enables control of the focus lens to be driven at a desired timing, without any waiting time for communication process, thus providing high accuracy automatic focus control. it

DETAIL DESCRIPTION OF PREFERRED EMBODIMENTS

First Embodiment

1. Structure

Figure 1:
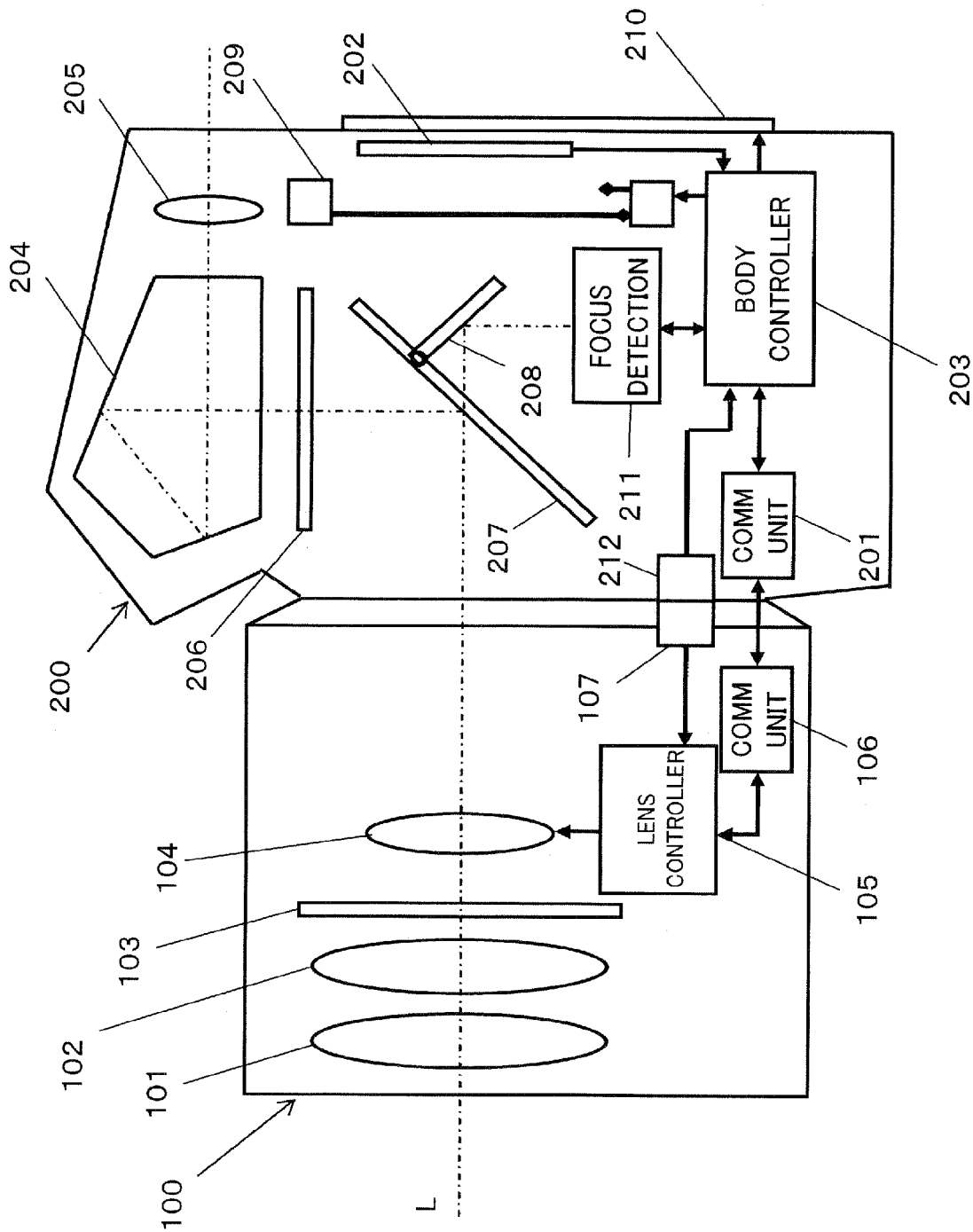
FIG. 1 is a block diagram showing an imaging system in a finder view mode of a first embodiment.
Figure 2:
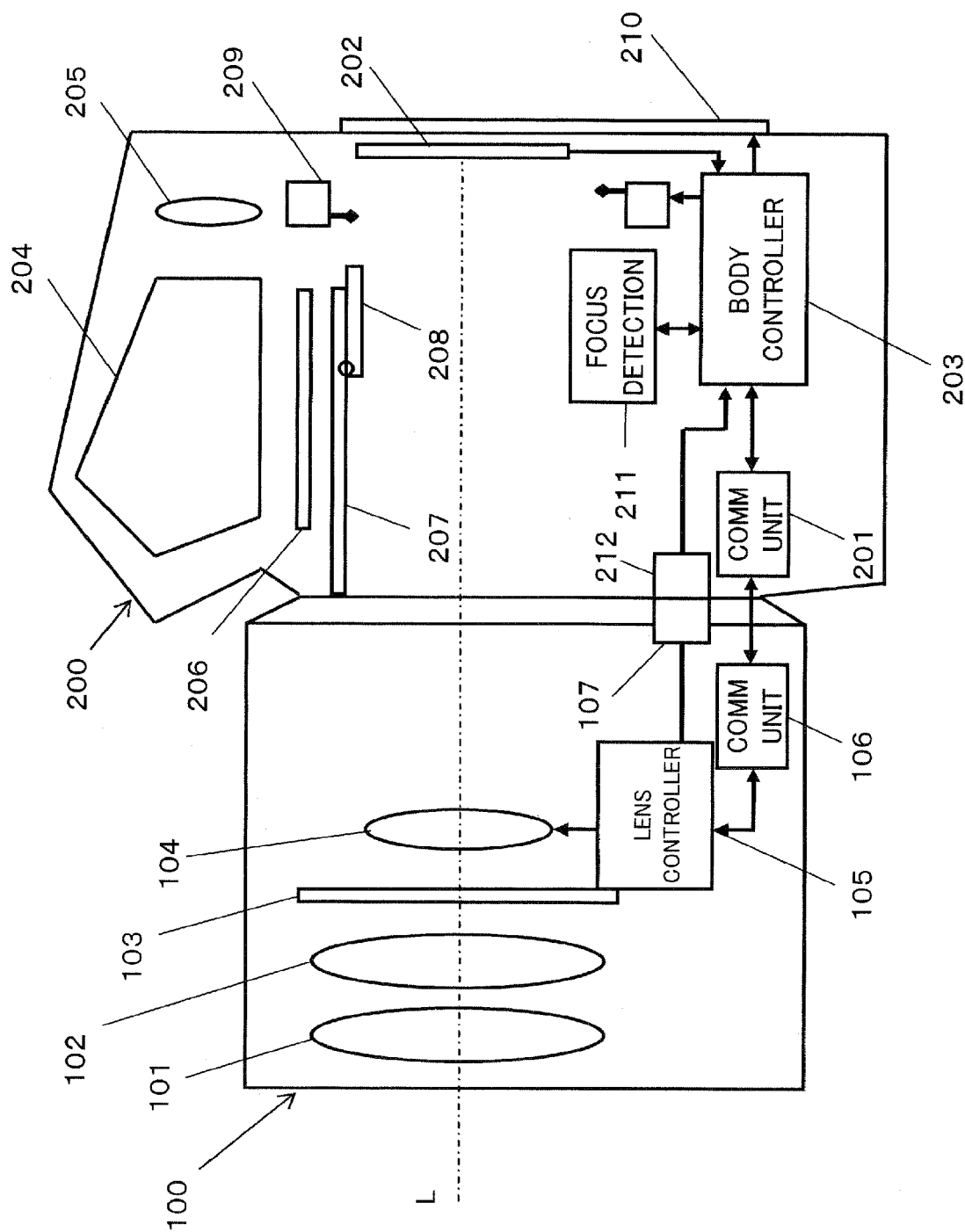
FIG. 2 is a block diagram showing the imaging system in a live view mode of the first embodiment.

FIGS. 1 and 2 are block diagrams that show an imaging system in accordance with a first embodiment. FIGS. 1 and 2 respectively show structures of the imaging system in a finder view mode and in a live view mode respectively (each mode will be detailed later). The imaging system is composed of an interchangeable lens 100 and a camera body 200. The interchangeable lens 100 is mountable to the camera body 200 at a predetermined position.

1-1. Camera Body

The camera body 200 is provided with a second communication unit 201, an imaging element 202, a main body controller 203, a penta-prism 204, an eyepiece lens 205, a focus plate 206, a main mirror 207, a sub mirror 208, a shutter 209, an image display-use liquid crystal display unit (hereinafter, referred to as "LCD") 210, a focus detection unit 211, and a second terminal 212.

The main body controller 203 is an LSI which integrates a microcomputer, a control circuit for controlling respective parts in the camera body 200 and a signal processing circuit used for executing various signal processings. The main body controller 203 controls various kinds of sequences in the camera body 200. The main body controller 203 controls operations of the respective parts in the camera body 200, and also outputs control signals to a lens controller 105 through the second communication unit 201 and the first communication unit 106. The main body controller 203 can control operations of the imaging element 202. The main body controller 203 converts an image signal outputted from the imaging element 202 to image data which is digital signal, and also carries out various signal processings, such as white-balance control. The main body controller 203 can output image data obtained by the various signal processings to the LCD 210. The main body controller 203 can control drive of mechanisms such as the shutter 209, main mirror 207 and sub mirror 208. The main body controller 203 outputs a synchronizing (sync) signal to the lens controller 105 through the second terminal 212 and the first terminal 107.

Although the main body controller 203 is an LSI which integrates a microcomputer, a control circuit for controlling respective parts in the camera body 200 and a signal processing circuit used for executing various signal processings, the main body controller 203 may be configured by a plurality of LSIs. The camera body 200 is provided with a release button through which the user gives an instruction for an image recording operation, and a storage unit for storing image data obtained by image recording operation and the like, which are not shown in FIGS. 1 and 2.

The focus detection unit 211 captures an optical image reflected by the sub mirror 208, and can detect a focus state of the optical image. The focus detection unit 211 is implemented by an imaging element such as a CCD image sensor.

In the present embodiment, it is implemented by a line sensor. The focus detection by the focus detection unit 211 is referred to as a focus detection in a phase difference detection method.

The LCD 210 can display an image based on image data for display generated by the main body controller 203. In the present embodiment, although it is implemented by a liquid crystal display, it may be implemented by any display device, such as an organic EL display device.

The imaging element 202 can convert an optical image incident through the interchangeable lens 100 to an image signal, and output the resulting signal. The imaging element 202 may be composed of a CCD image sensor and a CMOS image sensor. Based on the contrast of the image signal outputted by the imaging element 202, the focus state of an optical image can be detected. The focus detection based on the image signal outputted by the imaging element 202 is referred to as a focus detection in a contrast detection method.

The shutter 209 which is placed at a position facing to the image receiving face of the imaging element 202 can transmit or block an optical image incident to the imaging element 202 from the interchangeable lens 100.

The sub mirror 208 reflects the optical image incident from the interchangeable lens 100, to the focus detection unit 211. The sub mirror 208 can be at a position on the optical axis L, as shown in FIG. 1 and at a position retreating from the optical axis L, as shown in FIG. 2.

The main mirror 207 which is implemented by a half mirror can reflect an optical image incident from the interchangeable lens 100 to the focus plate 206, and also transmit the optical image to the sub mirror 208. The main mirror 207 can be at a position on the optical axis L, as shown in FIG. 1 and at a position retreating from the optical axis L, as shown in FIG. 2.

The focus plate 206 forms image from an optical image reflected by the main mirror 207. The penta-prism 204 reflects internally the optical image formed on the focus plate 206 to lead the optical image to the eyepiece lens 205. In the present embodiment, an optical finder which is configured by the focus plate 206, the penta-prism 204 and the eyepiece lens 205 allows the user to see the optical image from the outside of the eyepiece lens 205.

In the present embodiment, a finder view mode and a live view mode can be switched to each other. Here, the live view mode is a mode in which the optical image incident to the interchangeable lens 100 is converted to image data in the camera body 200 so that the image data can be displayed on the LCD 210. The finder view mode is a mode in which the optical image incident to the interchangeable lens 100 can be seen by the user through the eyepiece lens 205. In the following description, the live view mode is referred to as "LV mode", and the finder view mode is referred to as "finder mode."

1-2. Interchangeable Lens

The interchangeable lens 100 includes an objective lens 101, a zoom lens 102, an iris unit 103, a focus lens 104, a lens controller 105, a first communication unit 106 and a first terminal 107.

The lens controller 105 is an LSI which integrates a microcomputer and a control circuit for controlling the respective parts of the interchangeable lens 100. The lens controller 105 controls the zoom lens 102, the iris unit 103 and the focus lens 104 based on a control signal outputted from the main body controller 203 through the first and second communication units 106 and 201. The lens controller 105 shifts the focus lens 104 along the optical axis L based on a control signal outputted from the main body controller 203. Moreover, the lens controller 105 controls a wobbling operation of the focus lens 104 based on a reference signal and information indicating a phase with respect to the reference signal transmitted from the main body controller 203.

Although the lens controller 105 is implemented by one LSI integrating a microcomputer and a control circuit for controlling respective parts in the interchangeable lens 100, it may be implemented by a plurality of LSIs. The interchangeable lens 100 includes a mechanism for detecting shake, a storage unit for storing image data inherent to the interchangeable lens 100, and so on, which are not shown in FIGS. 1 and 2.

The focus lens 104 is arranged so as to be movable in the optical axis L direction by a driving means such as a focus motor (not shown).

2. Operation

In the finder mode, the focus lens 104 is moved at once according to the focus state of an optical image detected by the focus detection unit 211 (phase-difference detection method). In contrast, in the LV mode, the focus lens 104 is gradually moved according to the focus state of an optical image detected based on the contrast of an image signal outputted by the imaging element 202 (contrast detection method). The following description will discuss operations in the LV mode.

2-1. Contrast Detection Method

Figure 3:
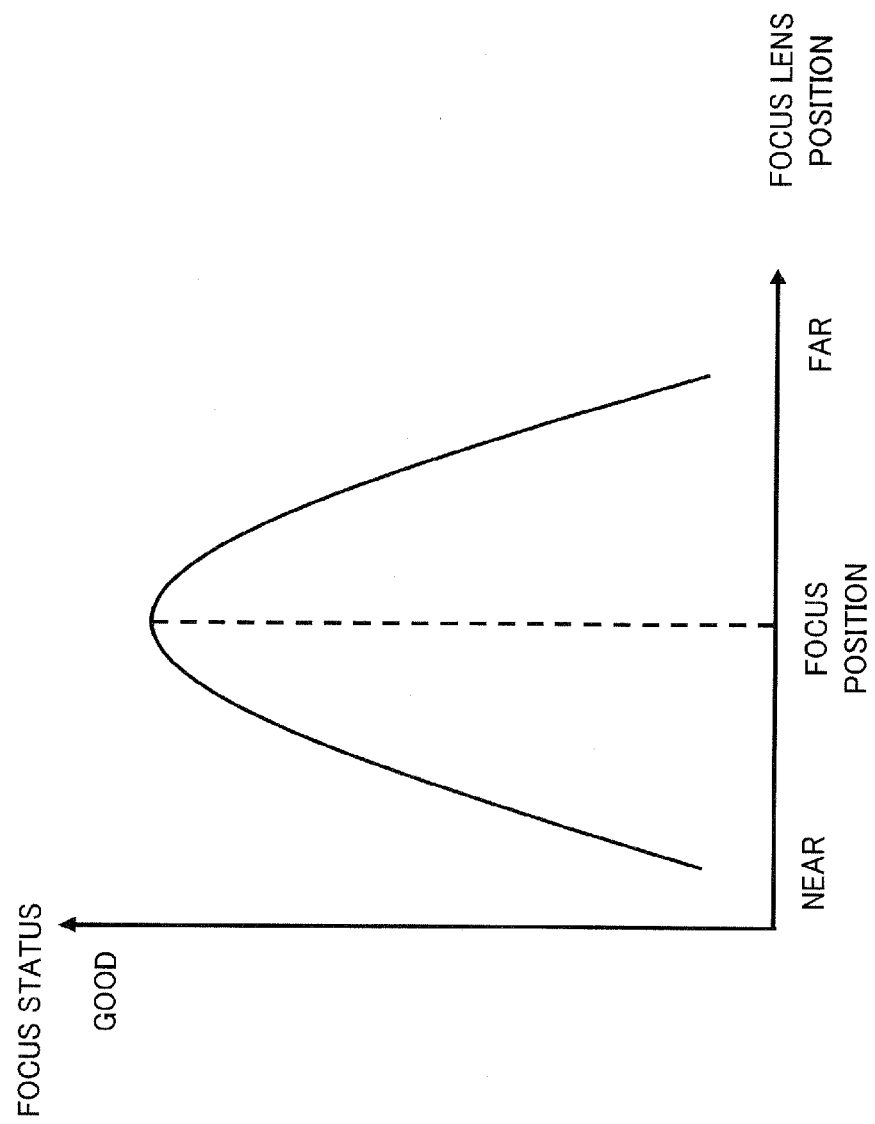
FIG. 3 is an explanatory drawing of a focus detecting operation in accordance with a contrast detection method (mountain-climbing method).

FIG. 3 is an explanatory drawing of the focus detecting operation in the contrast detection method. The axis of abscissa indicates the position of the focus lens 104 on the optical axis L. The axis of ordinates indicates the focus state of an optical image detected based on the contrast of an image signal outputted by the imaging element 202. The focus state is improved as the position on the optical axis L of the focus lens 104 comes closer to the focus position. The position on the optical axis L of the focus lens 104 which provides a peak of the focus state corresponds to the focus position.

2-2. Wobbling Operation

In order to move the position of the focus lens 104 on the optical axis L to the focus position, the focus lens 104 is finely vibrated on the optical axis L. Based on the change in the focus state at the lens position finely vibrated, it is determined which direction the focus position exists in with respect to the present position of the focus lens 104 on the optical axis L, and the position of the focus lens 104 on the optical axis L is gradually moved to the focus position. This operation is referred to as "wobbling operation."

Figure 4:
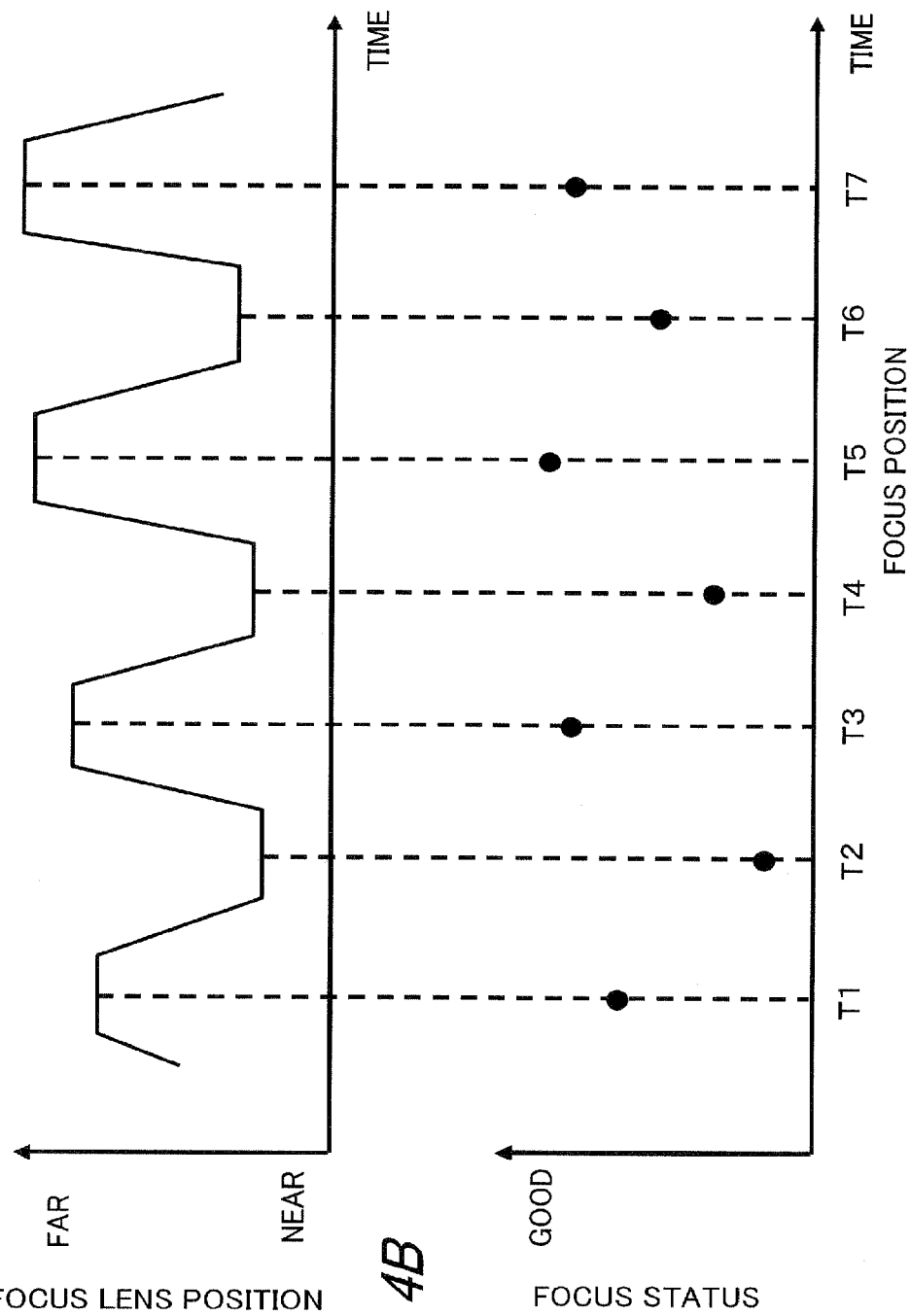
FIGS. 4A-4B are views showing change in a position of a focusing lens on an optical axis L during a wobbling operation.

FIG. 4A-4B show a change in position of the focus lens 104 on the optical axis L during the wobbling operation. FIG. 4A shows the position on the optical axis L of the focus lens 104 which is finely vibrated in the wobbling operation. FIG. 4B shows the focus state from a time T1 to a time T7.

At a time T1 the focus lens 104 is moved toward the far side from the present position, and at time T2 the focus lens 104 is moved toward the near side. The focus state of the focus lens 104 located on the far side at the time T1 is better than the focus state of the focus lens 104 located on the near side at the time T2. Thus, it is known that the focus position would be located on the far side relative to the present position of the focus lens 104. Therefore, at a time T3, the focus lens 104 is further moved toward the far side. The focus state of the focus lens 104 located on the far side at the time T3 is better than the focus state of the focus lens 104 located on the far side at the time T1. Thus it is presumed that the focus position would be further located on the far side relative to the present position of the focus lens 104. Therefore, at a time T5, the focus lens 104 is further moved toward the far side. The focus state of the focus lens 104 located on the far side at the time T5 is better than the focus state of the focus lens 104 located on the far side at the time T3, and thus it is presumed that the focus position would be further located on the far side relative to the present position of the focus lens 104. Therefore, at a time T7, the focus lens 104 is further moved toward the far side. However, since the focus state of the focus lens 104 located on the far side at the time T5 is better than the focus state of the focus lens 104 located on the far side at the time T7, it is known that the focus position would be located on the near side relative to the present position of the focus lens 104. Based on these operations, it is determined that the focus position exists at the position where the focus lens 104 is located at the time T5.

2-3. Operation Sequence

Figure 5:
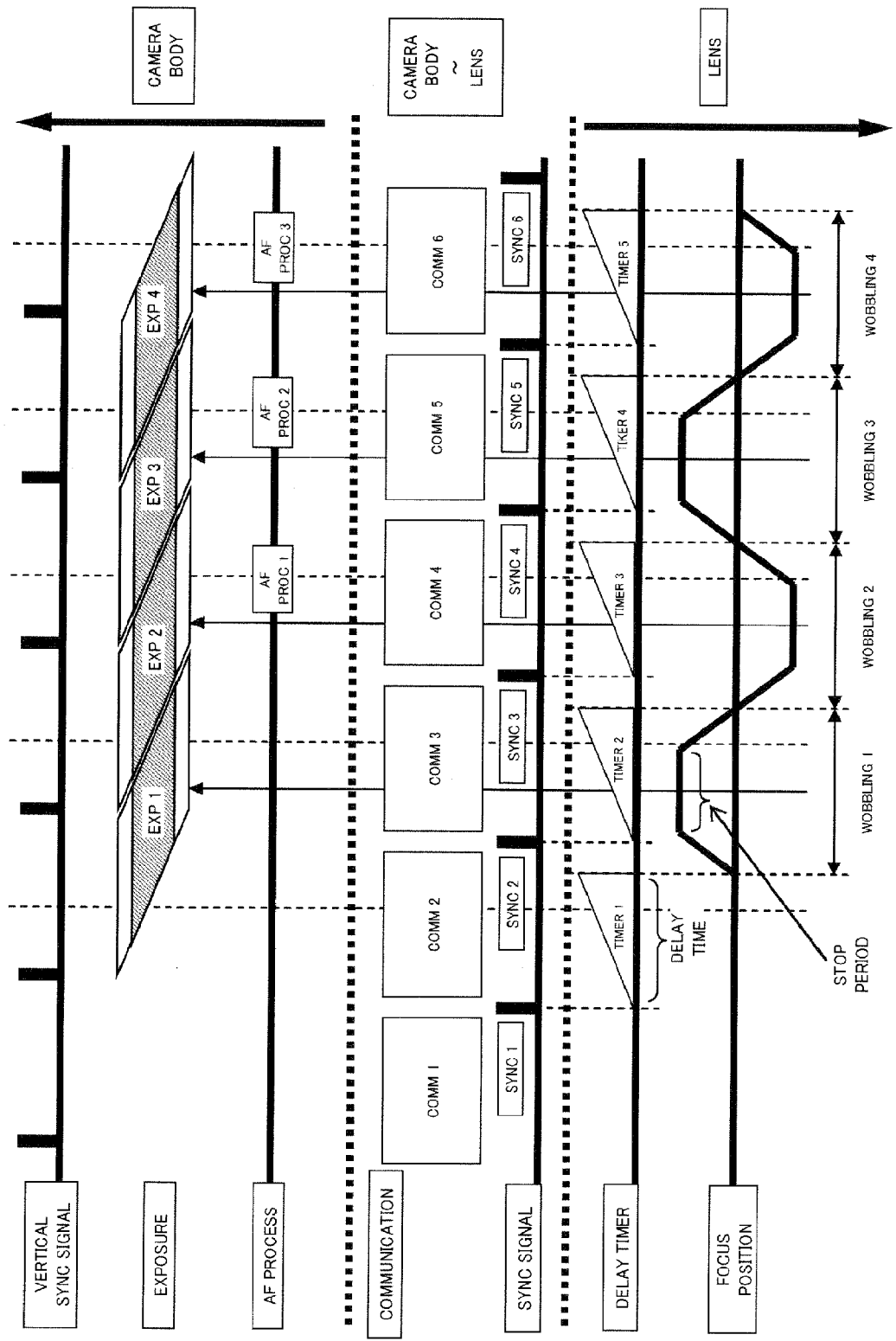
FIG. 5 is a view showing an operation sequence during the wobbling operation with long exposure time.

FIG. 5 is a view that shows an operation sequence during a wobbling operation. The axis of abscissa represents a time axis with the time elapsing from left to right. The "vertical synchronizing (sync) signal", "exposure" and "AF process" correspond to operations inside the camera body 200. Moreover, "delay timer" and "focus position" correspond to operations inside the interchangeable lens 100. "Communication" and "synchronizing (sync) signal" correspond to communications and signals performed or communicated between the camera body 200 and the interchangeable lens 100.

The "vertical synchronizing (sync) signal" is a reference signal for optical image capturing operation by the imaging element 202 which starts the capturing of an optical image upon receipt of a rise of the vertical synchronizing signal.

The "exposure" represents operations of exposing and capturing of an optical image of the imaging element 202. In the present embodiment, the imaging element 202 is implemented by a CMOS image sensor. In a CCD image sensor, the entire light-receiving plane of the sensor is exposed at the same timing. In contrast, in the CMOS image sensor, an image is exposed sequentially line by line so that the signal is successively acquired. For this reason, the timing in which the image signal is acquired differs depending on the lines. Thus, when the axis of abscissa is taken as the time axis, the relationship between the image area and exposure timing is represented in a parallelogram shape, as shown in FIG. 5.

Moreover, "AF process" is an auto-focus process of a contrast detection method in which, a filtering process or the like is performed based on an image signal outputted from the CMOS image sensor 202, and calculates conditions and the focus position of the next wobbling operation.

The "communication" represents processes performed between the second communication unit 201 of the camera body 200 and the first communication unit 106 of the interchangeable lens 100, such as transmitting and receiving processes of communication data, preparation of data to be transmitted, and processing of received data. The communication data include a command from the camera body 200 and a response thereto from the interchangeable lens 100, such as an operation command for the focus lens 104 to be transmitted from the camera body 200 to the interchangeable lens 100, position information of the focus lens 104 to be transmitted from the interchangeable lens 100 to the camera body 200. For operation commands, conditions for performing the wobbling operation are transmitted from the camera body 200 to the interchangeable lens 100, such as a delay time to delay the start of the wobbling operation from the receipt of the synchronizing signal by the interchangeable lens and an amount of movement of the focus lens 104 in the wobbling operation. Here, the synchronizing signal is one example of the reference signal, and the delay time is one example of the information that indicates a phase with respect to the reference signal.

The preparation of data to be transmitted includes the following processes.

1) To prepare response data replying to a command. For example, a sensor for motor position and zoom lens position and so on is checked and data is detected. For a request for retransmission of data, data to be retransmitted is prepared.

2) To generate data (set) to be transmitted according to the communication protocol and store it in a memory.

3) To store data to be transmitted in a transmission register, and then start transmission.

4) To set the next data to be transmitted when transmission of the previous data is completed (the priority of this process is high because it needs to set the next data rapidly in order to perform smooth transmission).

The processing of received data includes the following processes.

1) To retrieve data from a reception register (hardware) and store it in a memory (the priority of this process is high because it needs to complete retrieving of data before the next received data is set).

2) To check received data (set) (check whether data is in conformity with the communication protocol). When the data is malformed data (error), retransmission is requested.

3) To analyze data to retrieve a command.

4) To perform process according to a command. For example, if a command is for focus driving, motor control data such as position to be instructed is generated.

The "synchronizing signal" is a signal providing the reference for start timing of the wobbling operation and is outputted from the main body controller 203 of the camera body 200 to the lens controller 105 of the interchangeable lens 100. In consideration of variations in the communication processing time, the synchronizing signal is outputted from the camera body 200 at a timing after elapse of a predetermined time from the vertical synchronizing signal so that the synchronizing signal is always outputted after completion of communication process of the interchangeable lens 100.

The "delay timer" represents a change in counts of a delay timer that counts delay time from the receipt of a synchronizing signal by the interchangeable lens 100 to the start of the wobbling operation. The delay timer is built in the lens controller 105. Information relating to the delay time measured by the delay timer is transmitted from the camera body 200 to the interchangeable lens 100 as a wobbling operation condition.

The "focus position" represents the position of the focus lens 104 when the wobbling operation is performed under a predetermined condition. FIG. 5 shows the wobbling operation in which the wobble in the plus and minus directions from the initial position is performed. In FIG. 5, the delay time of the delay timer is set so that the center of the stop period of the wobbling operation of the focus lens 104 is coincident with the exposure center of the imaging element 202 (a timing at which the center of the image area is exposed) (see an upward arrow in FIG. 5). The setting of the delay time will be described later.

The following description will discuss an operation sequence for the wobbling operation. First, in order to acquire the position of the focus lens 104 of the interchangeable lens 100 and the control state thereof, necessary information is transmitted from the interchangeable lens 100 to the camera body 200. Next, an operation command including wobbling operation conditions, such as the delay time and amount of movement, are transmitted from the camera body 200 to the interchangeable lens 100. The interchangeable lens 100 determines delay time and amount of movement based on the operation command, and performs necessary software setting required for the wobbling operation (communication 1).

Upon completion of the communication, the camera body 200 outputs a synchronizing (sync) signal which provides the reference timing for the wobbling operation to the interchangeable lens 100, at a predetermined timing (sync 1). When receiving the synchronizing signal, the interchangeable lens 100 activates the delay timer so as to count the delay time (timer 1). The camera body 200 starts capturing an optical image in synchronization with the rise of the vertical synchronizing signal (exposure 1). When the delay timer counts the delay time specified by the camera body 200, the focus lens 104 starts the wobbling operation (wobbling 1). In such a control operation, the stop period of the wobbling operation is substantially coincident with the exposure center (see an upward arrow in FIG. 5). Upon completion of the image capture for one cycle, the AF process is performed (AF process 1) and the condition for the next wobbling operation is calculated. The operation command including the calculated wobbling operation condition is again transmitted from the camera body 200 to the interchangeable lens 100 (communication 4). The above described sequence of operation is for the wobbling operation for one cycle. When the wobbling operations are performed continuously, the respective processes are continuously executed at predetermined timings.

The following description will discuss the delay time. The delay time is set such that the center of the stop period of the focus lens in the wobbling operation is substantially coincident with the center of the exposing period of the image area from which the contrast detection is performed. The reason for setting the delay time in this manner is because a precise focus state cannot be obtained unless the focus state is detected from an image captured in the stopped state of the focus lens. In an example shown in FIG. 5, the focus state is detected from the center area of an image. Therefore, the delay time is set so that the center of the stop period of the focus lens 104 is substantially coincident with the center of an exposure timing (hatched portion having a parallelogram shape in FIG. 5) corresponding to the center area of the image.

The stop period of the focus lens is set to a fixed value, that is, for example, to one half the time of one frame period (for example, 8.8 msec). The main body controller 203 grasps the exposure timing, and thus it can recognize which area of the image is exposed at what timing. Therefore, the main controller 203 can set the delay time in such a manner that the stop period of the wobbling operation is substantially coincident with the exposure period of a desired image area.

Figure 6:
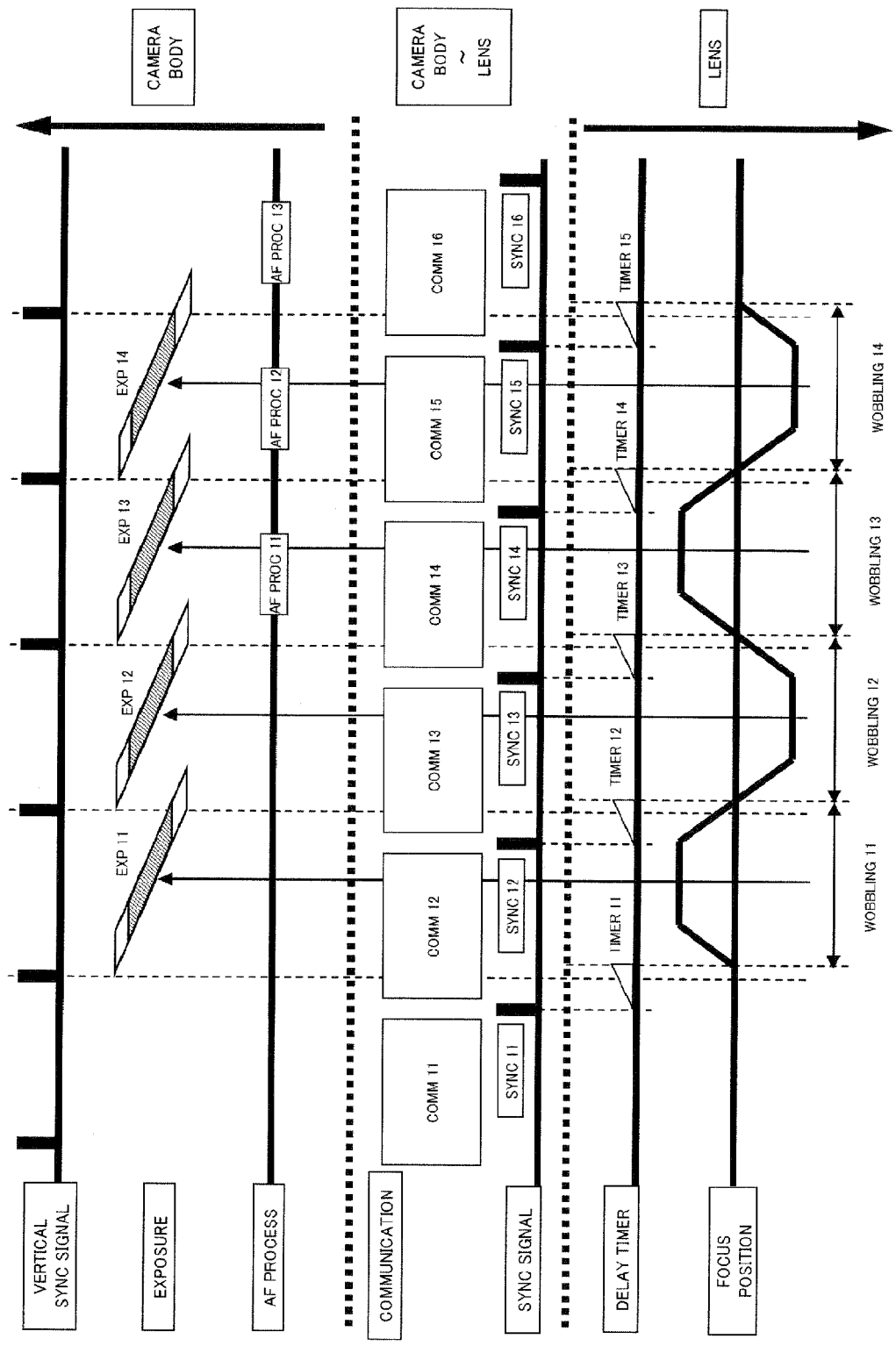
FIG. 6 is a view showing an operation sequence during the wobbling operation with short exposure time.

FIG. 6 is a view that shows an operation sequence during a wobbling operation with the exposure time shorter than that in the operation shown in FIG. 5. The generation timing of the vertical synchronizing signal is the same as the operation of FIG. 5. However, the amount of light from a subject is large, and thus the exposure time is shortened. The delay time of the delay timer is set in such a manner that the stop period of the wobbling operation is substantially coincident with the exposing period of the center area of the image. In the operation of FIG. 6, the exposing period of the center area of the image is shifted forward on the time basis in comparison with the operation of FIG. 5, and thus the delay time is set to be smaller than that in the operation of FIG. 5.

Figure 7:
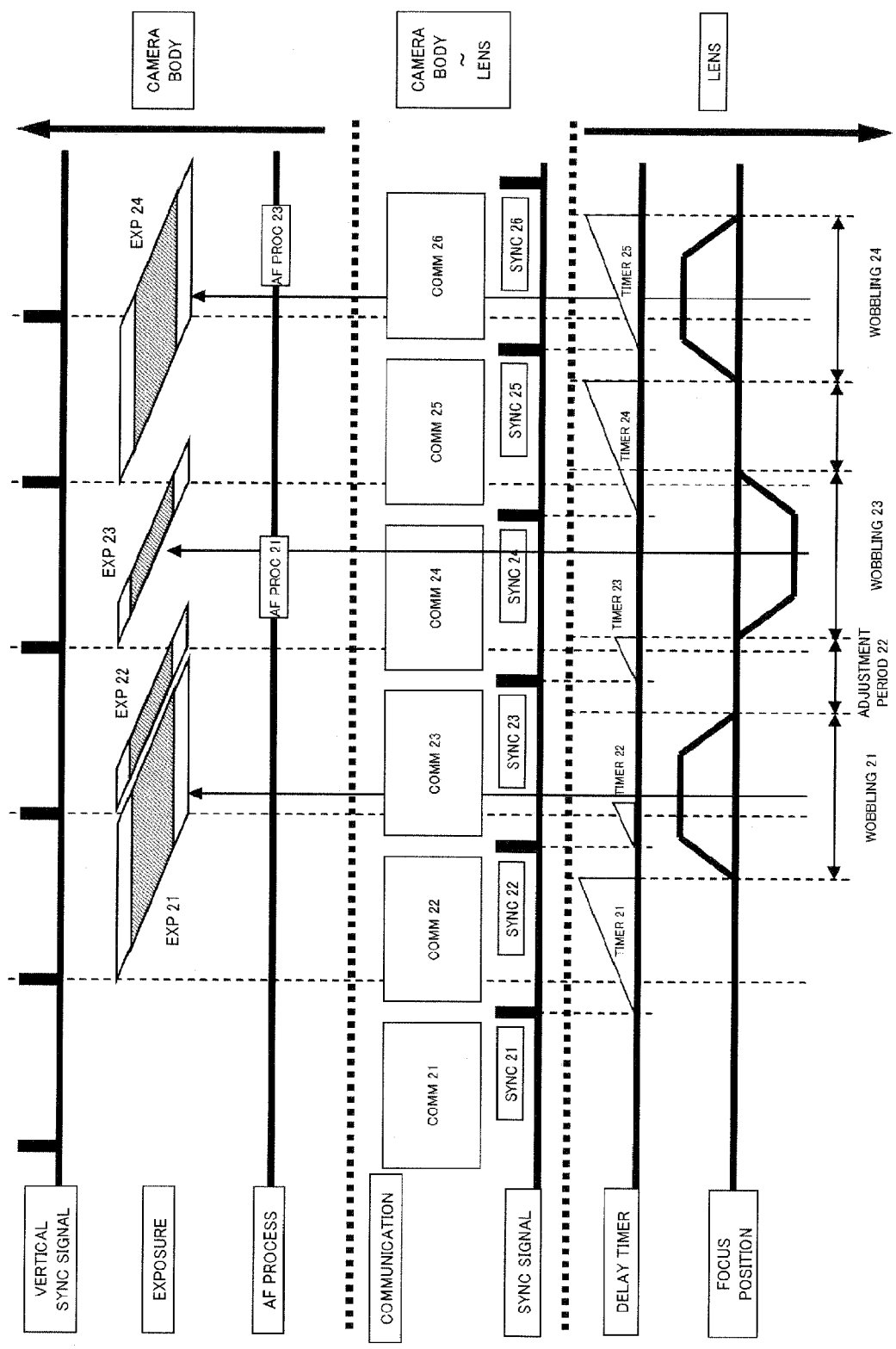
FIG. 7 is a view showing an operation sequence when a delay time is changed according to a change in an exposure time.

FIG. 7 is a view that shows an operation sequence during a wobbling operation when the exposure time of an image is different for each frame. Since the timings of the centers of exposures 21, 22 and 23 are different respectively, the delay times (timers 21, 22 and 23) relating to the exposures 21, 22 and 23 are also set to different values respectively. Upon completion of the count of the delay time (timer 21) relating to exposure 21, a wobbling operation (wobbling 21) is started on the exposure 21. Thereafter, although the count of the delay time (timer 22) relating to the exposure 22 is finished, a wobbling operation for the exposure 22 is not started and the operation of the wobbling 21 is kept, since the timing of the completion of counting is before the completion of the operation of the wobbling 21. Thereafter, the operation of the wobbling 21 is finished. However, since at that time the delay timer is not active, the next wobbling operation starts when the delay timer completes the next counting (the timer 23 that counts a delay time for the exposure 23). Thereafter, upon completion of the count of the delay time (timer 23) for the exposure 23, a wobbling operation (wobbling 23) for the exposure 23 is started. After completion of the wobbling 23, a wobbling operation (wobbling 24) for the exposure 24 is started when the count of the delay time (timer 24) for the exposure 24 is completed.

Figure 8:
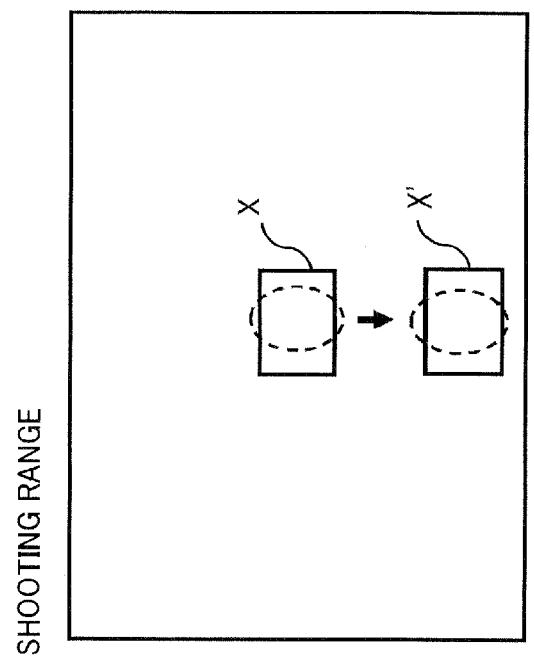
FIG. 8 is a view explaining a shift of an AF frame.
Figure 9:
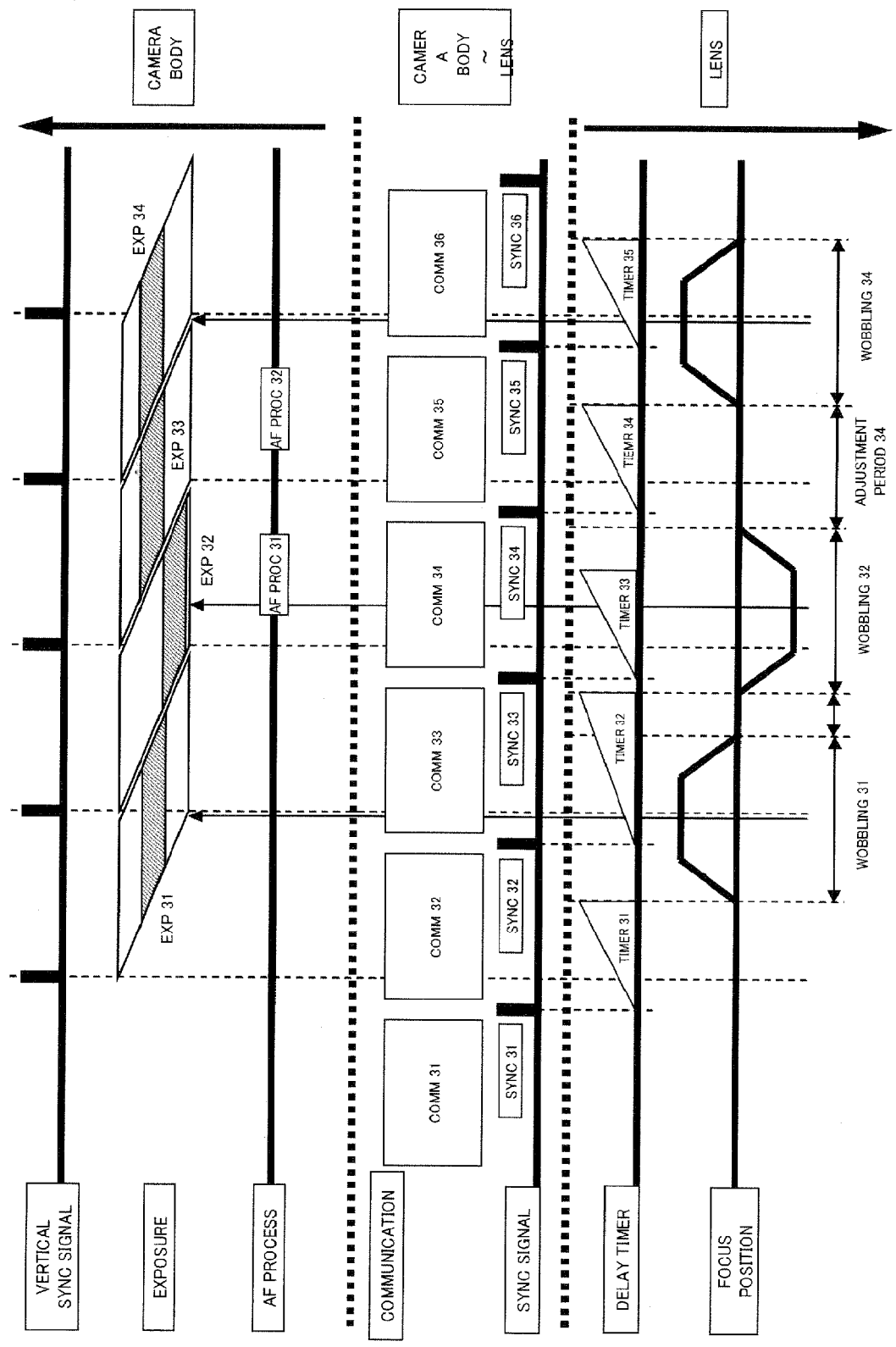
FIG. 9 is a view showing an operation sequence when a delay time is changed according to a change in the position of the AF frame.

The area (hereinafter, referred to as "AF frame") in an image from which the focus status is detected is not necessarily required to be fixed. For example, when the imaging system has a function for detecting a face of a subject, the AF frame may be set to the image area from which the face is detected. In this case, the AF frame may be possibly moved. For example, as shown in FIG. 8, the position of the face of a person as a subject is moved downward from the center, the AF frame is also moved from position X to position X'. Along with the movement of the AF frame, it is necessary to dynamically change the stop period of the wobbling operation. FIG. 9 shows an operation sequence during the wobbling operation when the AF frame is moved. In FIG. 9, the exposure 31 indicates an exposure of an image area corresponding to the AF frame X set in the center position as shown in FIG. 8, and the exposure 32 indicates an exposure of an image area corresponding to the AF frame X' set in the lower position. Since the AF frame X' is positioned below the center of the image, the image area corresponding to the AF frame X' is exposed at a delayed timing in comparison with the image area corresponding to the AF frame X positioned in the center of the image, with respect to the exposure starting time. For this reason, the delay time (timer 32) relating to exposure 32 corresponding to the AF frame X' is set to a value larger than the delay time (timer 31) relating to exposure 31 corresponding to the AF frame X.

Figure 10:
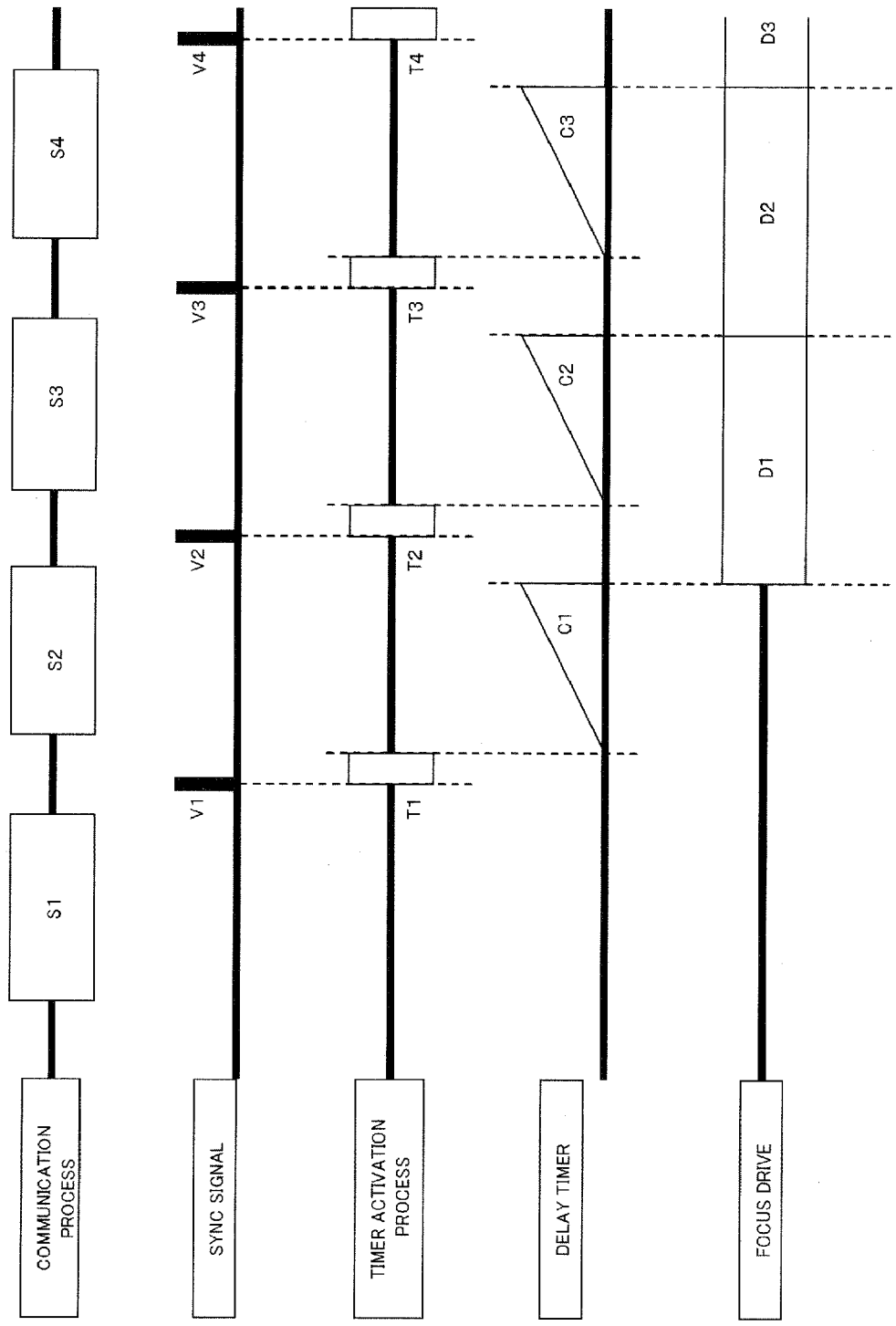
FIG. 10 is a drawing that shows processes to be executed by a lens controller.

FIG. 10 is a view that shows processes to be executed in the lens controller 105 of the interchangeable lens 100.

The "communication process" indicates a processing of communication data performed in the lens controller 105. The first communication unit 106 transmits and receives communication data with the second communication unit 201 of the camera body 200 in accordance with communication protocol such as serial synchronizing communication and the like. The lens controller 105 performs transmission/reception of data with the first communication unit 106, preparation of transmission data, and processing of reception data.

The "synchronizing (sync) signal" represents a signal that provides the reference of start timing of the wobbling operation, and is outputted from the main body controller 203 of the camera body 200 to the lens controller 105 of the interchangeable lens 100.

The "timer activation process" represents a process for starting the count of a delay timer upon receipt of a synchronizing signal.

The "delay timer" represents a change in a count by a delay timer that counts a delay time from the receipt of a synchronizing signal by the interchangeable lens 100 to the start of the wobbling operation.

The "focus drive" represents a process for operating a focus motor to drive the focus lens 104.

Here, the counting operation of the delay timer and the focus driving operation are performed by hardware. In contrast, the communication process and timer activation process should be performed by software of a microcomputer of the lens controller 105 because preparation of transmission data, processing of received data, and setting of the delay time should be executed. Since the respective processes need to be activated by requests externally given, it is configured to use an interrupt function of the microcomputer so that the corresponding operation is immediately executed upon receipt of a request. In particular, since the exchange of communication data between the first communication unit 106 and the lens controller 105 needs to input and output communication data for each byte, the interrupt processes of the microcomputer in the lens controller 105 occur frequently.

Referring to FIG. 10, an operation sequence in the lens controller 105 when a wobbling operation is executed will be described below.

A communication process is executed to perform communication between the interchangeable lens 100 and the camera body 200 (S1). Upon end of the communication (S1), a synchronizing (sync) signal that is a reference of the timing of a wobbling operation is transmitted from the camera body 200 to the interchangeable lens 100 at a predetermined timing (V1). Upon receipt of the synchronizing signal by the interchangeable lens 100, a timer activating process is activated by the interrupt function so that a delay time instructed by the camera body 200 is set in the delay timer, thereby activating the delay timer (T1). The delay timer successively counts up. When the count reaches the delay time set as the count value (C1), a focus drive operation is started. The focus motor is operated by the focus drive operation so that the focus lens 104 performs a predetermined wobbling operation (D1).

The above-mentioned operations correspond to the operation sequence of the lens controller 105 during the wobbling operation for one cycle. When performing the wobbling operations continuously, the respective processes are continuously executed at predetermined timings. The camera body 200 transmits a synchronizing signal (V1, V2, . . . ) after the end of each communication process (S1, S2, . . . ), thus allowing the timer activating processes to be performed immediately (T1, T2, . . . ) without any waiting time for process. In this manner, execution timings of the interrupt processes to be executed is controlled by the microcomputer of the lens controller 105 so as to prevent the communication process and the timer activating process from simultaneously occurring. This allows each process to be performed at a required timing without causing any waiting time for process.

Here, the case in which the execution timing of the interrupt process to be executed by the microcomputer in the lens controller 105 is not controlled with the result that interrupt processes simultaneously occur will be discussed below.

Figure 11:
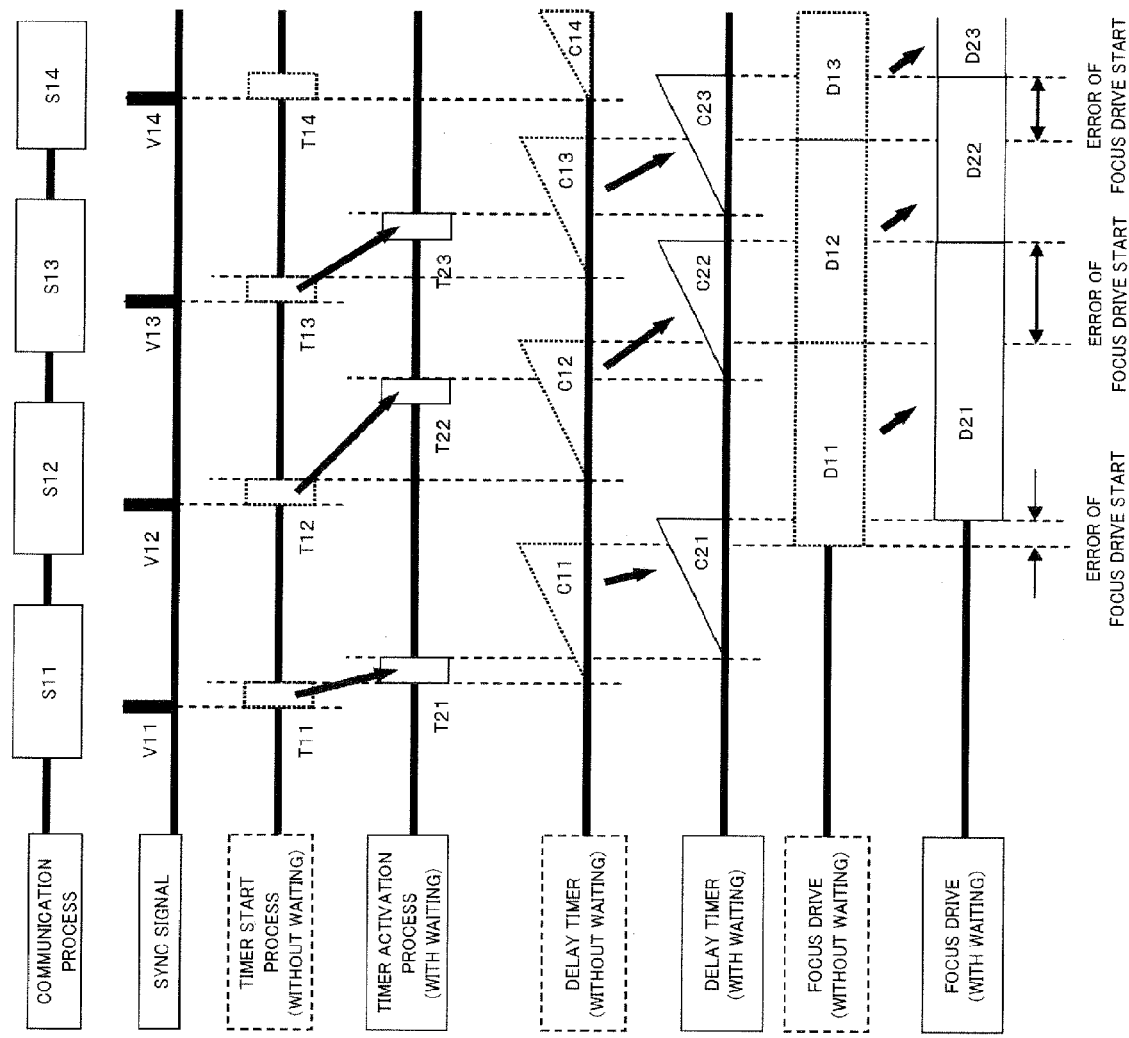
FIG. 11 is a view showing an operation sequence when a communication process and a timer activating process are simultaneously executed.

FIG. 11 is a view that shows a sequence of operations in which a communication process and a timer activation process occur simultaneously. In this case, for the priority for execution in the microcomputer, the communication process has higher priority than the timer activation process. The reason why the priority is set in this manner is because the communication process is performed with the camera body 200 and thus the transmitting and receiving processes thereof need to be completed within a predetermined period of communication time.

When a timer activation process occurs during a communication process, the execution of the timer activation process is not permitted immediately. The timer activation process waits for execution for a predetermined waiting time. The waiting time differs depending on a time specific to communication process and structure of software process. For example, the waiting time continues until a part of the communication process finishes or the entire communication process finishes. For this reason, the timer activation process is delayed, and the succeeding timing of completion of the count of the delay timer and start timing of the focus drive are delayed.

In FIG. 11, regarding "timer activation process", "delay timer" and "focus drive", two cases are shown for sake of simplicity of explanation: that is, "without process-waiting time" case and "with process-waiting time" case. The case of "without process-waiting time" corresponds to a case in which the respective processes and operations are performed without any waiting time for the timer activation process. The case of "with process-waiting time" corresponds to a case in which a waiting time for the timer activation process occurs, thus resulting in delays in the respective processes and operations. The sequence of "without process-waiting time" case shows ideal sequence for sake of simplicity of explanation. However, the operation is done actually according to the sequence of "with process-waiting time" case.

Referring to FIG. 11, a specific operation sequence of the lens controller 105 when interrupt processes occur simultaneously will be detailed below.

A communication process is executed (S11) to communicate between the interchangeable lens 100 and the camera body 200. During the communication process, a synchronizing signal that is a reference for the timing of a wobbling operation is transmitted from the camera body 200 to the interchangeable lens 100 (V11). Upon receipt of the synchronizing signal by the interchangeable lens 100, an activation request for a timer activation process occurs by an interrupt function. If the communication process is not under execution, the timer activation process is executed immediately (T11). However, the communication process (S11) is under execution, and thus the execution of the timer activation process is not permitted immediately. Therefore, the timer activation process is executed after a process-waiting time elapses (T21). In the case of no process-waiting time for the timer activation time, the delay timer is operated at the timing of C11. However, the delay timer is operated at the timing of C21 due to the occurrence of the process-waiting time. In the case of no process-waiting time for the timer activation time, the focus drive operation is activated at a timing of D11. However, since the process-waiting time occurs, the focus drive is activated at the timing of D21. In this manner, since the focus drive operation is not activated at the timing requested by the camera body 200, the instructed wobbling operation is not executed to cause degradation of the focus detecting function of the AF process, resulting in an error in the focus position, or a failure in the focusing process. Moreover, the waiting time for the timer activation process due to the communication process varies depending on status of the communication process. Hence the delay time is not fixed as shown in D21, D22 and D23. Consequently, the drive operation of the focus motor is unstable without a fixed cycle, resulting in abnormal noise during the motor drive operation.

In this manner, the execution timing of the interrupt process to be executed by the microcomputer of the lens controller 105 is controlled so that, particularly, processes that need to be executed immediately, such as interrupt processes, are prevented from occurring simultaneously. Therefore, the communication process and the timer activation process can be executed immediately at the requested timings, and thus a predetermined wobbling operation instructed by the camera body 200 can be executed. As a result, it becomes possible to maintain the focus detecting function of the AF process with high precision.

Figure 12:
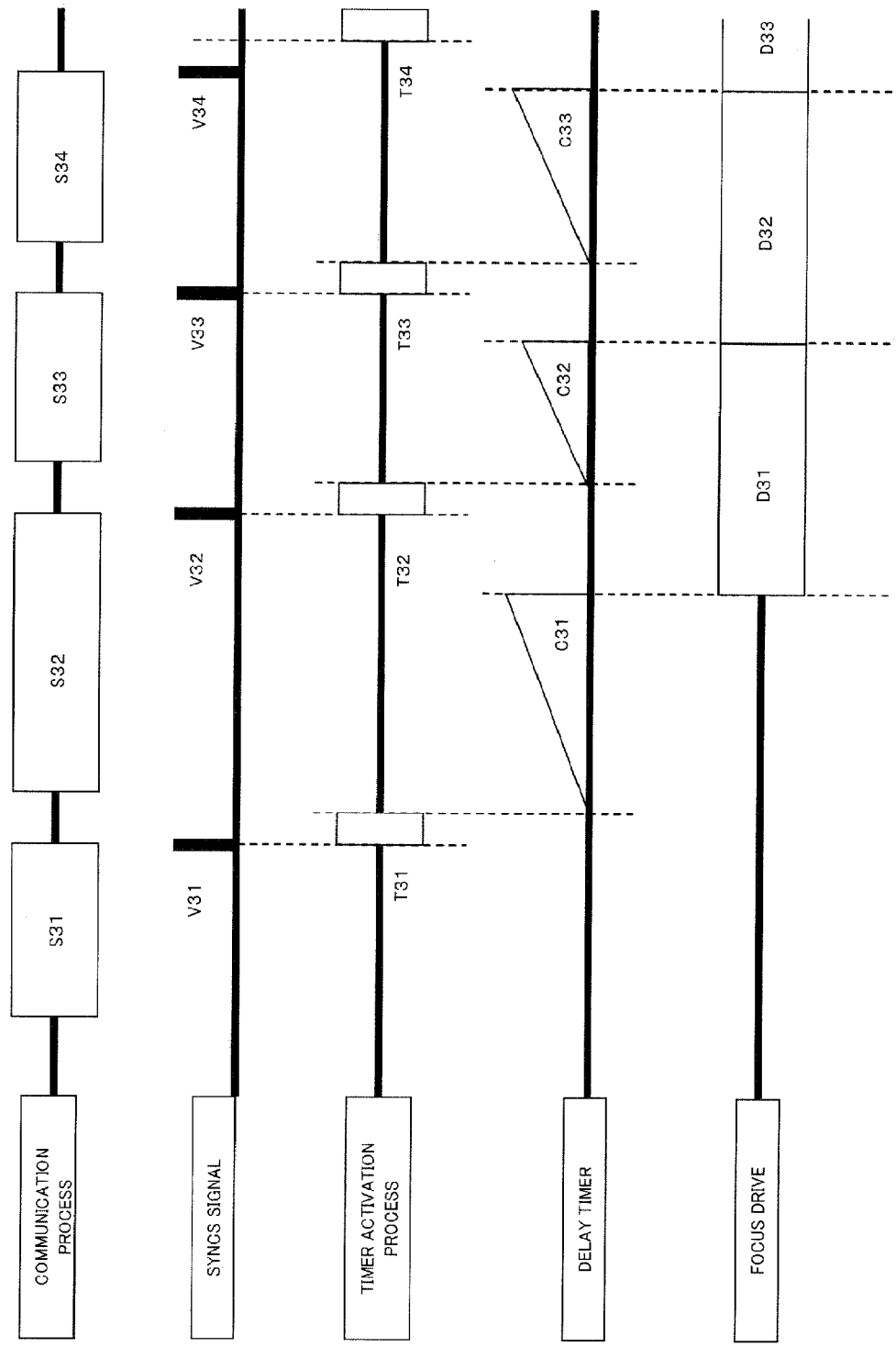
FIG. 12 is a view showing processes to be executed by a lens controller when a communication processing time is changed.

Referring to FIG. 12, an operation sequence of the lens controller 105 when time of the communication processing varies will be described below.

FIG. 12 is a view that shows processes to be executed by the microcomputer in the lens controller 105 of the interchangeable lens 100 when the communication processing time varies. When a communicating operation with the amount of communication data being changed is performed, the end timing of the communication process becomes indefinite since the time required for the communication processes varies. Therefore, the synchronizing signal is transmitted from the camera body 200 to the interchangeable lens 100 after the end of the communication process. Since the vertical synchronizing signal of the camera body 200 is generated with a predetermined cycle, the capturing of optical image by the imaging element 202 is also started with a predetermined timing. Consequently, the delay time from the input of the synchronizing signal provided to the interchangeable lens 100 from the camera body 200 until the start of the wobbling operation is made coincident with the end timing of the communication process, that is, variable.

In FIG. 12, a communication process is performed (S31) to execute a communicating operation between the interchangeable lens 100 and the camera body 200. Upon end of the communication, a synchronizing signal that is a reference of the timing of a wobbling operation is transmitted from the camera body 200 to the interchangeable lens 100 (V31). Upon receipt of the synchronizing signal by the interchangeable lens 100, a timer activating process is performed by the interrupt function, so that a delay time instructed by the camera body 200 is set in the delay timer, thereby activating the delay timer (T31). The delay timer successively counts up. When the count reaches the delay time set as the count value, a focus drive operation is started (C31). The focus motor is operated by the focus drive operation so that the focus lens 104 performs a predetermined wobbling operation (D31).

The above-mentioned operations correspond to the operation sequence of the lens controller 105 during the wobbling operation for one cycle. When performing the wobbling operations continuously, the respective processes are continuously executed at predetermined timings. The communication processing time varies depending on the amounts of communication data, as indicated by S31, S32, S33 and S34, and thus the end count of the delay timer is also coincident with each of the end timings of the respective communication processes, as indicated by C31, C32 and C33. With this arrangement, the focus drive operation is executed at a timing requested by the camera body 200. In this manner, the camera body 200 outputs a synchronizing signal (V31, V32, ... ) after end of the communication process (S31, S32, ... ). Hence, even when the amount of communication data is changed, the timer activation process is executed immediately without any waiting time. That is, the synchronizing signal is output during a period in which no communication process is performed, so that the communication process and timer activation process can be executed at a requested timing. This arrangement enables execution of a predetermined wobbling operation instructed by the camera body 200, thus maintaining the focus detection performance of the AF process with high precision.

3. Summary

In accordance with the imaging system of the present embodiment, the operation command transmitted from the camera body 200 to the interchangeable lens 100 contains information relating to a delay time with respect to the reference signal (synchronizing signal) and the like. With this arrangement, various settings on the wobbling operation on the interchangeable lens 100 side can be easily achieved.

Moreover, in accordance with the imaging system of the present embodiment, as shown in FIG. 10 and the like, the transmission timing of the synchronizing signal (V1, V2, . . . ) is controlled so that the synchronizing signal (V1, V2, . . . ) and the communication process (S1, S2, . . . ) do not overlap with each other. With this arrangement, it is possible to prevent shift in the start timing of the wobbling operation due to a waiting time for processes that might occur when the communication processing time and the timing of the synchronizing signal are overlapped with each other. Consequently, it is possible to start the wobbling operation at a desired timing with high precision.

Second Embodiment

In the first embodiment, no limitations are particularly provided to the delay time (information indicating a phase relating to a reference signal) which is transmitted to the lens controller 105 from the main body controller 203. However, when the delay time to a reference signal is too short or too long, the lens controller 105 sometimes may fail to normally control the operation of the focus lens 104. The present embodiment provides an imaging system capable of solving such a problem.

Figure 13:
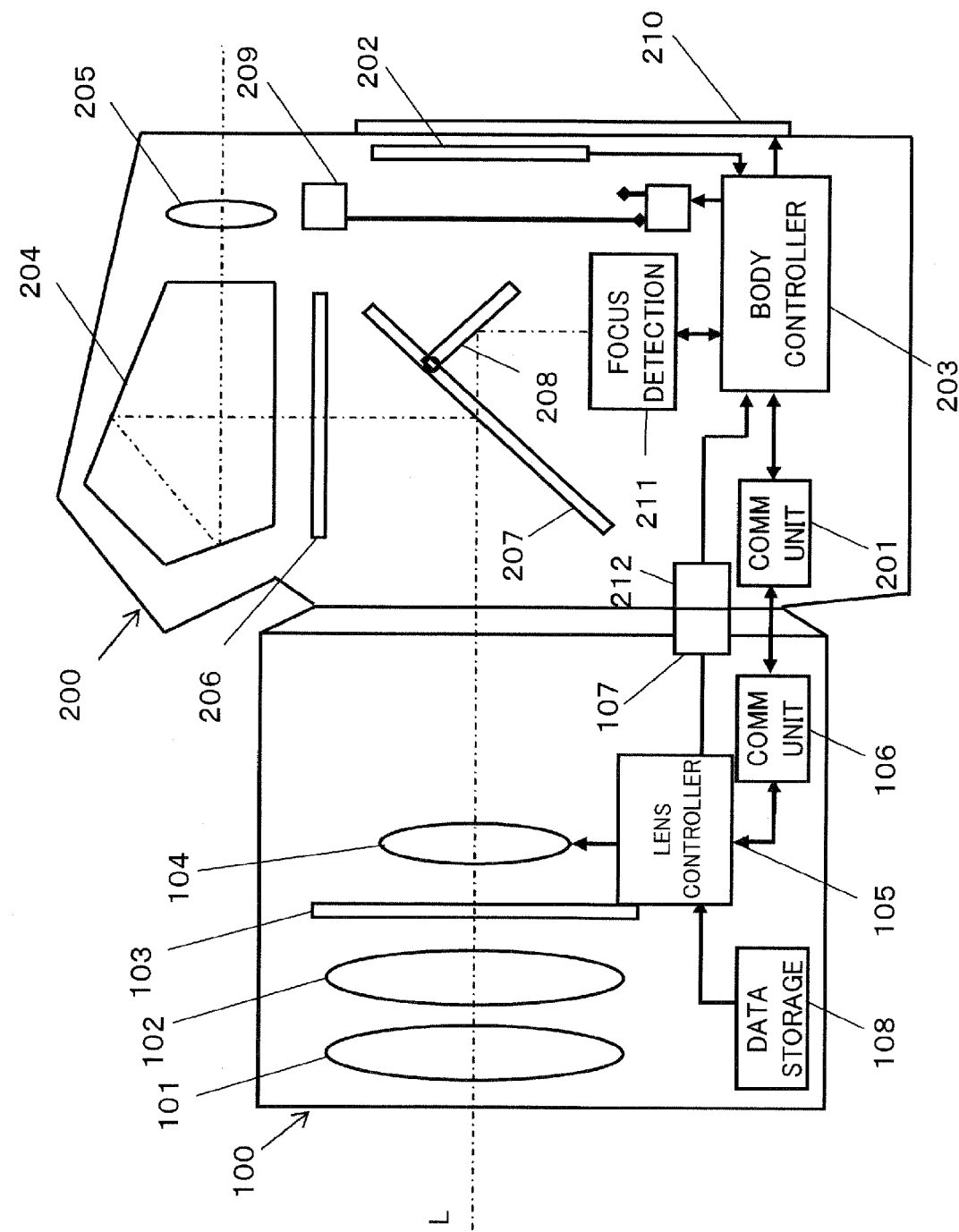
FIG. 13 is a block diagram showing an imaging system in accordance with a second embodiment.

FIG. 13 is a block diagram that shows an imaging system in accordance with a second embodiment. This structure differs from the structure of the imaging system of the first embodiment shown in FIG. 1 in that the interchangeable lens 100 has a storage unit 108. The other structures are the same as those of FIG. 1. The imaging system of the second embodiment is also provided with a finder view mode and a live view mode.

The storage unit 108 is means for storing characteristic information of the interchangeable lens 100, and is implemented by a memory element such as a flash memory. The characteristic information of the interchangeable lens 100 includes allowance information indicating allowable range of delay time. The allowance information includes maximum and/or minimum of the delay time. The main body controller 203 requests the lens controller 105 to transmit the characteristic information of the interchangeable lens 100 stored in the storage unit 108 through the second communication unit 201 and the first communication unit 106. The lens controller 105 reads the characteristic information of the interchangeable lens 100 from the storage unit 108, and transmits the information to the main body controller 203 through the first communication unit 106 and the second communication unit 201. The main body controller 203 transmits the delay time that the interchangeable lens 100 allows, to the lens controller 105, based on the allowance information indicating the allowable range of delay time in the received characteristic information of the interchangeable lens 100. The timing the main body controller 203 requests the lens controller 105 to transmit the characteristic information of the interchangeable lens 100 stored in the storage unit 108 may be upon activation of the imaging system, or upon detection of the attachment of the interchangeable lens 100.

When the received delay time is shorter than the minimum of the delay time allowed by the interchangeable lens 100, the lens controller 105 cannot drive the focus lens 104 based on the reference signal and the delay time information. Moreover, when the received delay time is longer than the maximum of the delay time allowed by the interchangeable lens 100, the lens controller 105 cannot drive the focus lens 104 normally based on the reference signal and the delay time information because of overflow of the built-in timer of the lens controller 105, and so on. Therefore, the main body controller 203 acquires information indicating the allowable range of delay information stored in the storage unit 108 of the interchangeable lens 100, and transmits information indicating a delay time within the allowable range to the controller 105, preventing malfunction of the interchangeable lens 100 from occurring.

In the second embodiment, the storage unit 108 is prepared as an independent memory element. However, the structure of the storage unit 108 is not intended to be limited by this. For example, the lens controller 105 may have a function for the storage unit 108.

Other Embodiments

In the aforementioned embodiments, the delay time from the input of the synchronizing signal to the start of the wobbling operation is used as information indicating the phase to a reference signal. However, the embodiments are not intended to be limited by this. A delay time up to the stop of the wobbling operation may be used as the information indicating the phase to a reference signal, or a delay time up to substantially the center of the stopping time of the wobbling operation may be used. In these cases, the lens controller 105 calculates the time up to the start of the wobbling operation and sets the calculated time in the delay timer. Thus, the main body controller 203 does not need to take into consideration the time required for the focus lens 104 to move to the stop position of the wobbling operation and the time substantially up to the center of the stopping period of the wobbling operation. Consequently it is possible to easily deal with several kinds of interchangeable lens which include the focus lenses 104 having different response (fast or slow).

In the aforementioned embodiments, the focus lens 104 is driven by using a trapezoidal wave. However, the focus lens 104 may be driven by using a sine wave or a triangle wave. This arrangement may also be applied to the embodiments. When a sine wave or a triangle wave is used, the delay time may be set so that a peek of the waveform substantially coincides with an exposure timing of the center area of the image.

Moreover, the aforementioned embodiments have exemplified a structure which includes a main mirror 207 and a sub mirror 208 and has a finder mode that allows the user to visually recognize an optical image incident to the interchangeable lens 100 through an eyepiece lens 205. However, as clearly understood by the explanations of the embodiments, the idea of the embodiments is also applicable to an imaging system having only the LV mode. That is, the embodiments are also applicable to an imaging system without the main mirror 207, the sub mirror 208, the penta-prism 204, the eyepiece lens 205, the focus plate 206, and the focus detection unit 211, by which the user can record an image visually while recognizing an object displayed on the LCD 210.

Moreover, in FIG. 6 or the like, the wobbling operation of one cycle (wobbling, 1, 2, . . . ) includes only the movement of the focus lens 104 in one direction (far side or near side). However, the wobbling operation of one cycle may include movements of the focus lens 104 in bi-directions (far side and near side).

INDUSTRIAL APPLICABILITY

According to the imaging system of the aforementioned embodiments, the exposure center timing of the imaging element may be substantially coincident with the stop period of the wobbling operation of the focus lens so that it becomes possible to perform auto focus control with high precision. Therefore, the present embodiments are effectively utilized for a single-lens digital camera system of a lens interchangeable type and a digital camera body.

Although the aforementioned description has been provided in connection with specified embodiments thereof, many other modifications, corrections and applications are apparent to those skilled in the art. Therefore, the embodiments are not limited by the disclosure provided herein. The present disclosure relates to subject matter contained in Japanese Patent Application No. 2008-082793, filed on Mar. 27, 2008, which is expressly incorporated herein by reference in its entirety.

What is claimed is:

1. An imaging system comprising an interchangeable lens and a camera body,
the interchangeable lens comprising:
a first communication unit; and
a lens controller operable to control drive of a focus lens;
the camera body comprising:
a second communication unit operable to communicate with the first communication unit; and
a main body controller operable to transmit a reference signal to the lens controller through the first communication unit and the second communication unit,
wherein
the main body controller transmits the reference signal to the lens controller, while communication of a predetermined signal other than the reference signal and transmission/reception process of data in accordance with a predetermined protocol related to the communication of the predetermined signal are not performed between the first and second communication units, and
the lens controller controls the drive of the focus lens based on a timing provided by the reference signal received from the main body controller.

2. The imaging system according to claim 1, wherein the transmission/reception process includes preparation of data to be transmitted or received, and temporal process of received data.

3. The imaging system according to claim 1, wherein the predetermined signal includes a command transmitted from the camera body to the interchangeable lens, and a response to the command which is transmitted from the interchangeable lens.

4. A camera body to which an interchangeable lens including a focus lens and a first communication unit is mountable, the camera body comprising:
a second communication unit operable to communicate with the first communication unit; and
a main body controller operable to transmit a reference signal for providing a reference timing to start driving of the focus lens to the lens controller through the first communication unit and the second communication unit,
wherein
the main body controller transmits the reference signal to the interchangeable lens so that a first period does not overlap with a second period, the first period is a period for which communication of a predetermined signal other than the reference signal and transmission/reception process of data in accordance with a predetermined protocol related to the communication of the predetermined signal are performed between the first and second communication units, and the second period is a period for which the reference signal is transmitted to the interchangeable lens.

5. The camera body according to claim 4, wherein the transmission/reception process includes preparation of data to be transmitted or received, and temporal process of received data.

6. The camera body according to claim 4, wherein the predetermined signal includes a command transmitted from the camera body to the interchangeable lens, and a response to the command which is transmitted from the interchangeable lens.

7. A camera body to which an interchangeable lens including a focus lens and a first communication unit is mountable, the camera body comprising:
a second communication unit operable to communicate with the first communication unit; and
a main body controller operable to transmit a reference signal for providing a reference timing to start driving of the focus lens to the lens controller through the first communication unit and the second communication unit,
wherein
the main body controller transmits the reference signal to the interchangeable lens after communication of a predetermined signal other than the reference signal and transmission/reception process of data in accordance with a predetermined protocol related to the communication of the predetermined signal are completed between the first and second communication units.

8. The camera body according to claim 7, wherein the transmission/reception process includes preparation of data to be transmitted or received, and temporal process of received data.

9. The camera body according to claim 7, wherein the predetermined signal includes a command transmitted from the camera body to the interchangeable lens, and a response to the command which is transmitted from the interchangeable lens.

* * * * *